May 10, 1932. H. W. SMITH ET AL 1,857,699
HARVESTER CONSTRUCTION
Filed Feb. 4, 1930   5 Sheets-Sheet 1
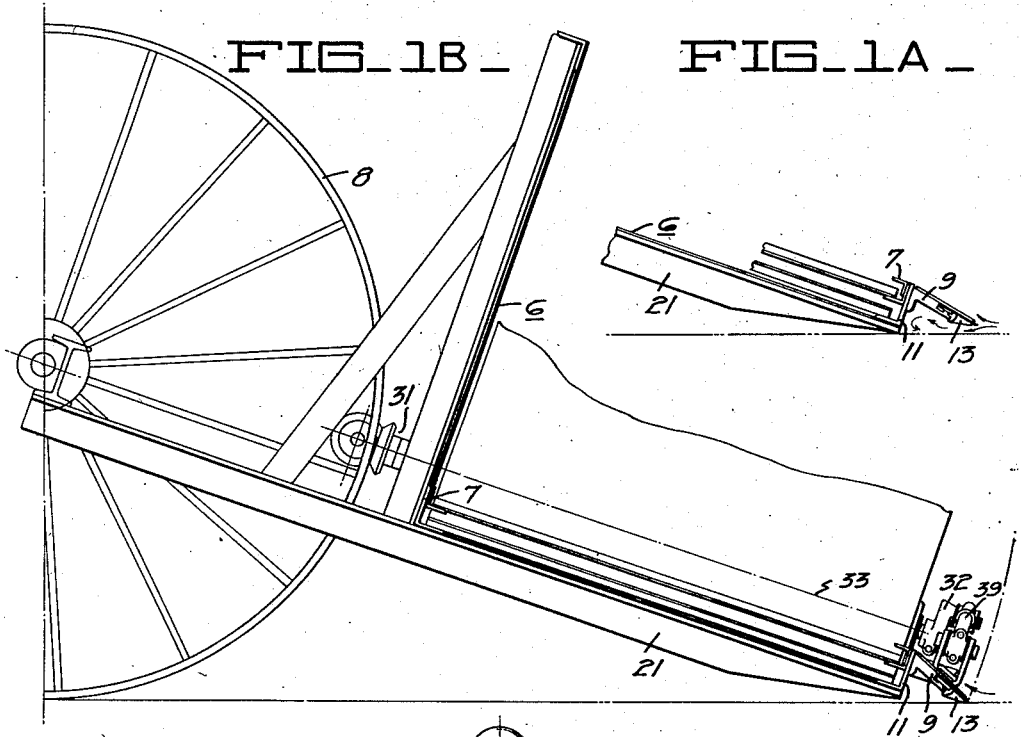
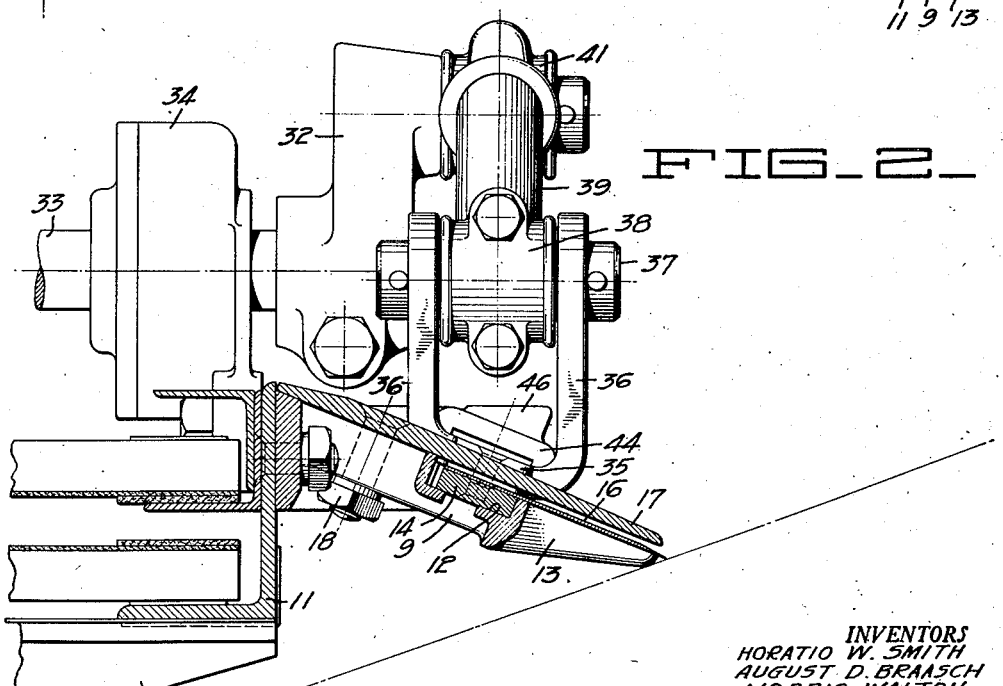
INVENTORS
HORATIO W. SMITH
AUGUST D. BRAASCH
NORRIS WALTON
BY
ATTORNEYS.

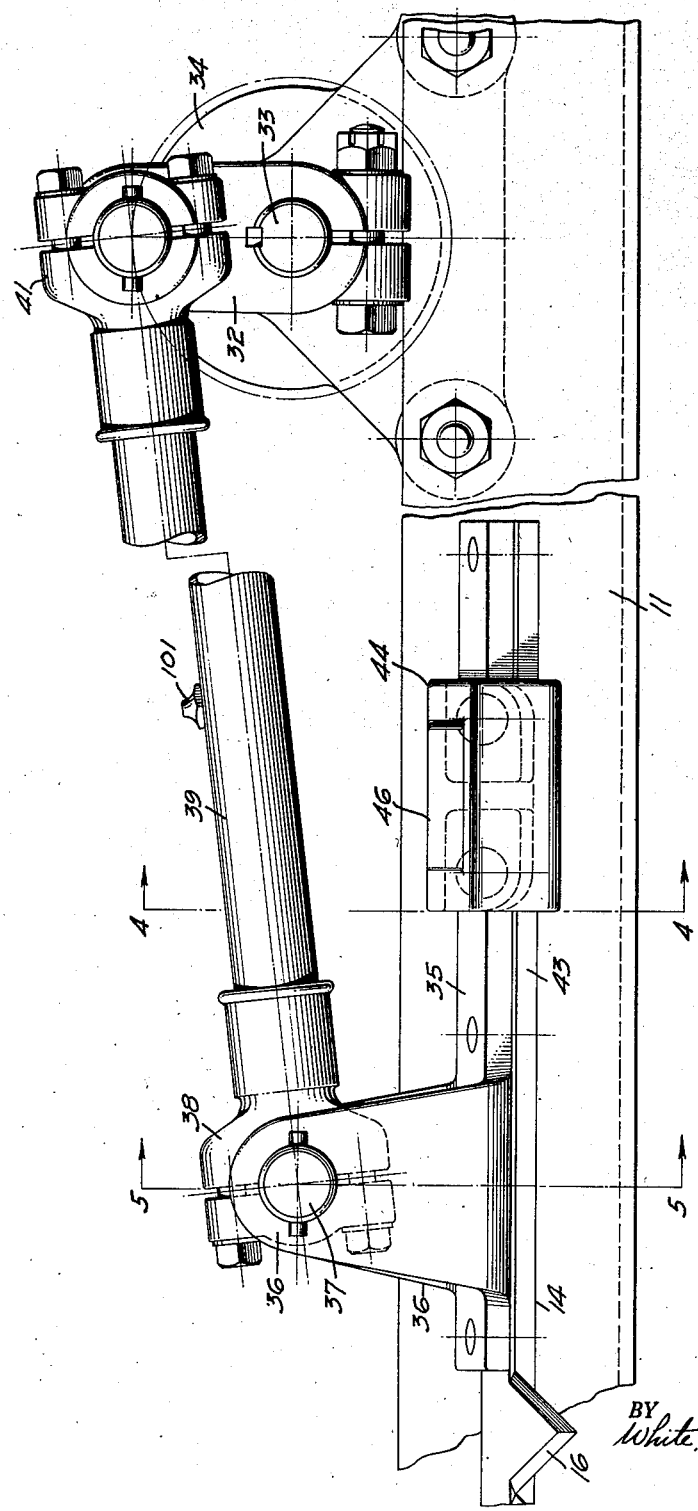

May 10, 1932.  H. W. SMITH ET AL  1,857,699
HARVESTER CONSTRUCTION
Filed Feb. 4, 1930  5 Sheets-Sheet 3
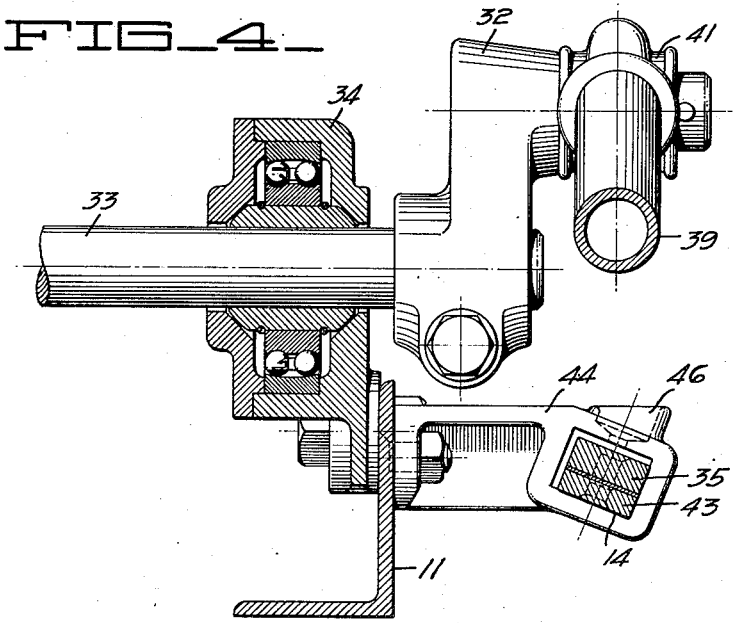
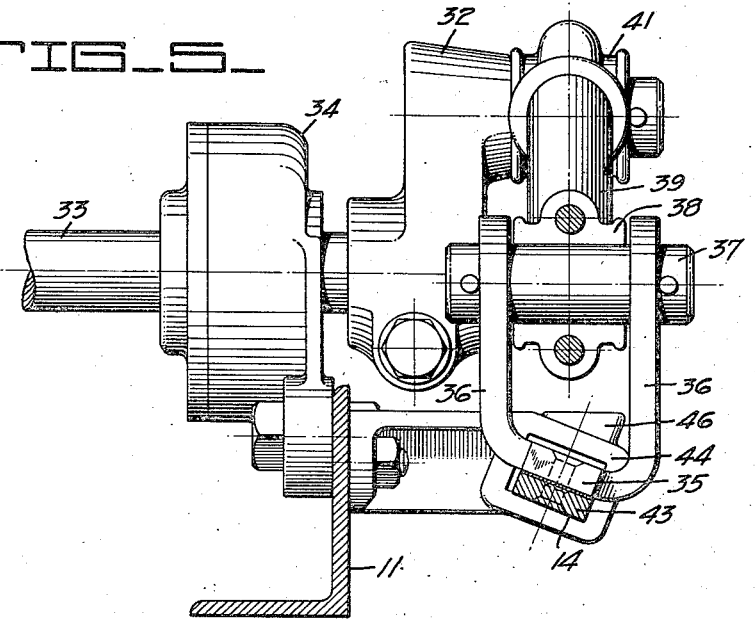
INVENTORS
HORATIO W. SMITH
AUGUST D. BRAASCH
NORRIS WALTON
BY
White, Prost, Flehr & Lothrop
ATTORNEYS.

May 10, 1932. H. W. SMITH ET AL 1,857,699
HARVESTER CONSTRUCTION
Filed Feb. 4, 1930 5 Sheets-Sheet 4
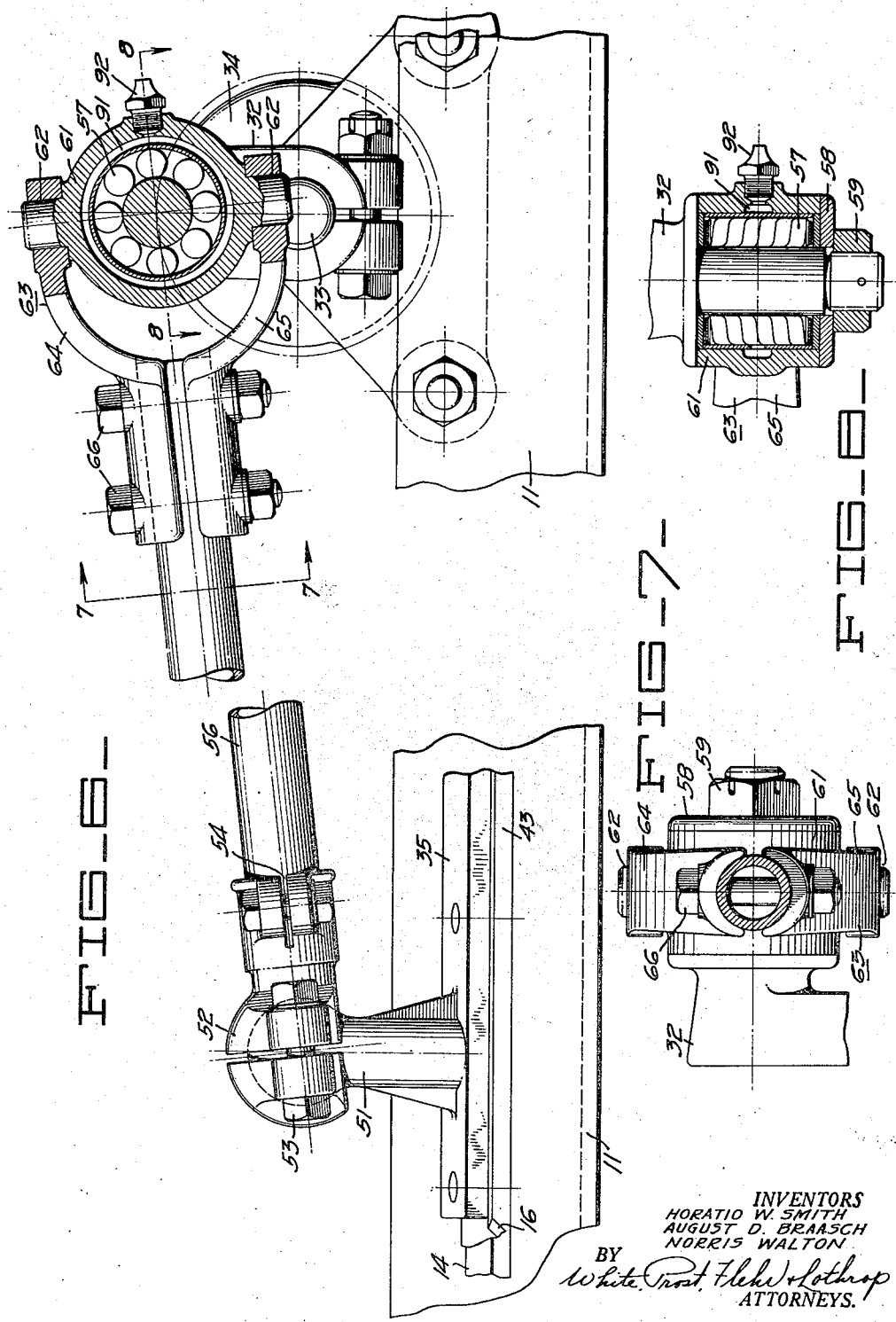
INVENTORS
HORATIO W. SMITH
AUGUST D. BRAASCH
NORRIS WALTON
BY
ATTORNEYS.

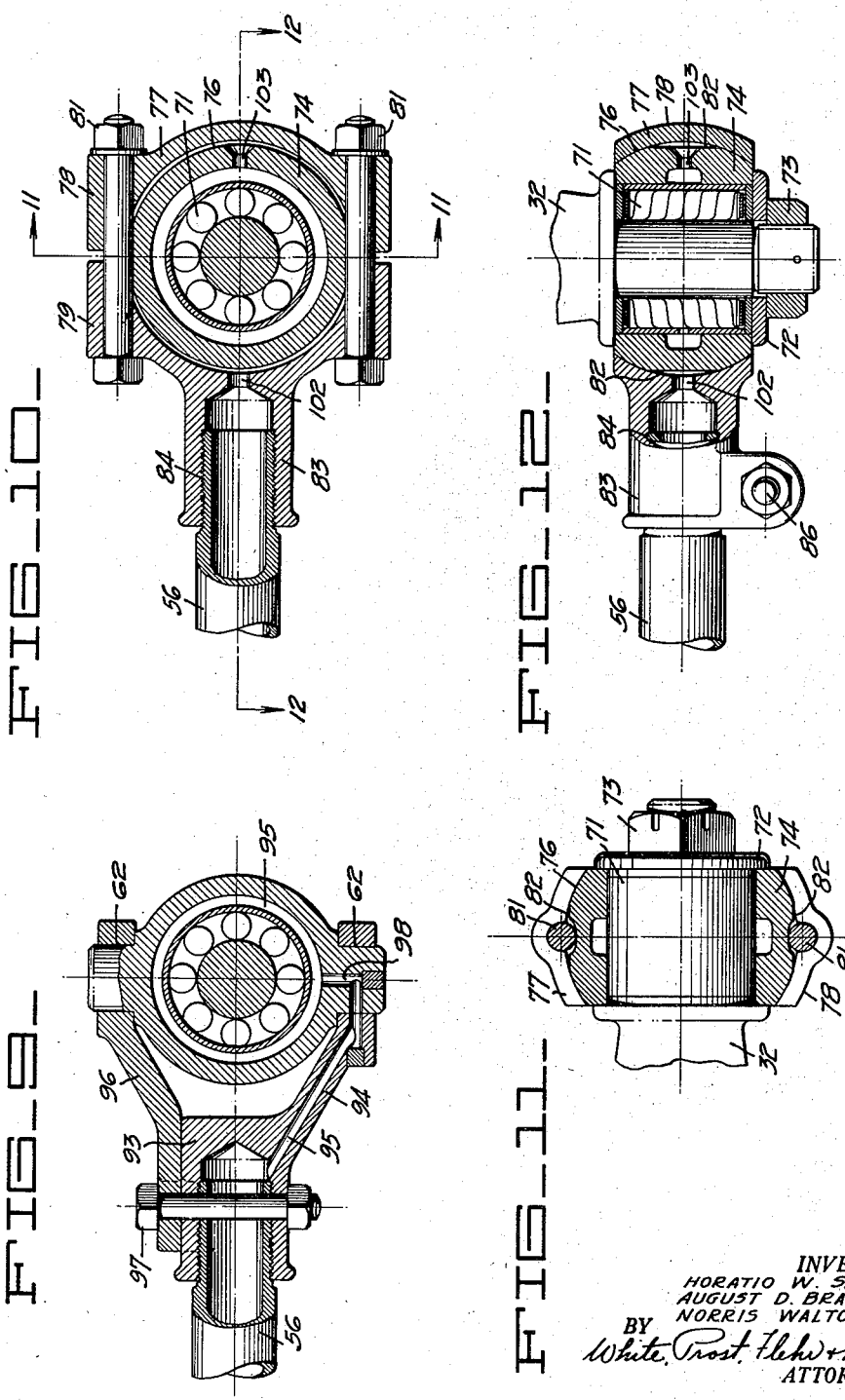

Patented May 10, 1932

1,857,699

UNITED STATES PATENT OFFICE

HORATIO W. SMITH, AUGUST D. BRAASCH, AND NORRIS WALTON, OF SAN LEANDRO, CALIFORNIA, ASSIGNORS TO CATERPILLAR TRACTOR CO., OF SAN LEANDRO, CALIFORNIA, A CORPORATION OF CALIFORNIA

HARVESTER CONSTRUCTION

Application filed February 4, 1930. Serial No. 425,801.

This invention relates to harvester construction and particularly to the means generally employed for cutting the material to be harvested. A feature of this invention is the provision of a guard for the cutting means effective during all operations of the harvester. Another feature of the invention is the operating of the cutting means by a power source through an improved connecting mechanism.

It is an object of the invention to devise a guard which prevents the accumulation and passage of trash to the cutting means and, at the same time, which provides that trash is not accumulated elsewhere on the harvester.

It is a further object of the invention to devise certain mechanisms for the driving of the cutting means and which enable the cutting means to be operated in a plane different from that in which the driving mechanism for the cutting means operates.

It is a further object of the invention to devise a pitman construction useful for connecting the cutting means to a driving mechanism, the pitman being formed to enable the cutting means to be operated in a plane substantially quite different from that of the driving mechanism.

The invention possesses other advantageous features and objects, some of which with the foregoing will be set forth at length in the following description where we shall outline in full that form of harvester construction of our invention, which we have selected for illustration in the drawings accompanying and forming part of the present specification. In said drawings we have shown a form of harvester construction embodying our invention, but it is to be understood that we do not limit ourselves to such form since the invention, as set forth in the claims, may be embodied in a plurality of forms.

In the drawings, to which we have made reference above, Figure 1—A is a side elevational view of a portion of a harvester structure illustrating certain of the disadvantages which are overcome in accordance with our invention.

Figure 1—B is a side elevation of a harvester structure embodying features of our invention.

Figure 2 is a side elevational view, partly in section, illustrating a guard construction embodying our invention wherein the trash is prevented from getting to the cutting means and from accumulating on other parts of the harvester.

Figure 3 is a side elevational view of the structure shown in Figure 2 illustrating the form of pitman.

Figure 4 is a section along the line 4—4 of Figure 3.

Figure 5 is a section along the line 5—5 of Figure 3.

Figure 6 is a side elevational view of another form of pitman construction.

Figure 7 is a cross section along the line 7—7 of Figure 6.

Figure 8 is a cross section along the line 8—8 of Figure 6.

Figure 9 is a section through a form of pitman connection.

Figure 10 is a section through another form of pitman connection.

Figures 11 and 12 are respectively sections along the lines 11—11 and 12—12 of Figure 10.

In harvesters employed for the cutting of such materials as grain, it is desirable to protect the means utilized for cutting the grain from operating upon anything apt to harm them. It has been proposed to provide a trash guard of some fashion to protect the cutting means. However, under some conditions, it has been our observation that the trash guard, while effective to protect the cutting means, is not provided to facilitate the cutting of grain and also that trash escapes past the guard means and accumulates on the harvester structure proper.

In Figures 1—A and 1—B of the drawings we have indicated the harvester as including a header 6 constructed of the usual angles and strip members 7 and mounted upon a wheel 8 so that it may be moved over a field. The header is hinged with respect to the wheel so that it may be raised and lowered relative to the field through a mechanism such as is typified by the well known Jacob's staff. The grain cutting means is constructed conveniently by securing a cast plate 9 to an angle 11 forming part of the header structure. The plate is formed with an aperture 12 and an extending prong 13. A sickle bar 14 is positioned in the aperture 12 provided in the plate 9 so that the sickle bar may be reciprocated to cause knives 16 which it carries to cut grain. The knives are preferably formed to be of sufficient extent to stick out in advance of the extending prongs 13 so that the material to be harvested may be cut off close to the ground and so that the knives remain free running and free from accumulations of track or straw. To protect the knives 16 against the gathering of rubbish or trash a guard plate 17 is secured to the plate 9 by bolts 18.

Referring particularly to Figures 1—A, 1—B and 2, it is to be noted that the plate 9 is formed so that the knives 16 are positioned at an angle with respect to the angle 11. In one form of harvester construction the angle 11 is carried by angle members 21 which extend forwardly from the wheels 8. In accordance with our invention we prefer to provide the plate 9 on the header so that the prongs 13 normally contact with the ground instead of the angle members 21. This overcomes the difficulty attendant in the structure shown in Figure 1—A where the angle members are apt to dig into the ground when it is desired that the knives cut close to the ground. This structure, besides resulting in the trash accumulating in the space between the angle 11 and the plate 9 when it was desired that the grain be cut off close to the ground, did not permit of the grain being severed very close to the ground as is frequently necessary. We preferably position the cast plate 9 relative to the angle 11 as is shown in Figures 1—B and 2 so that the prongs 13 thereon contact with the ground to prevent the angles 21 from digging into the ground as is shown in Figure 1—A and so that the grain may be cut close to the field. In operation, the field has not the smooth level contour indicated by the broken line in the drawings, being rough and having numerous rises and hollows. Under these conditions, the prongs 13 are effective to support the header structure, to lift it when the header passes over a rise so that trash is prevented from gathering upon the knives and against the angle 11 beneath the plate 9 and so that the knives are properly spaced from the field.

Movement of the knives is accomplished by reciprocating the sickle bar 14 back and forth across the header. Such movement is conveniently provided for by utilizing power transmitting means 31 effective to convey power from a suitable source as a bull wheel or a gasoline engine to a reciprocating means as crank 32. Since it is desirable practice to extend the knives 16 at an angle to the header structure, the driving of the sickle bar is effected by some means capable of accommodating itself to the angular difference between the header and the sickle bar. Thus, as is illustrated in Figure 4, the crank 32 is driven by a shaft 33 carried in self aligning bearing 34 secured to the angle 11, the crank rotating about the axis of the shaft 33. The plane of movement of the sickle bar 14 is at an angle to the axis of the shaft 33 about which the crank 32 rotates. Under these conditions it has previously been the practice to provide means fitting so loosely that the angular movement taking place was lost in the looseness of the connection. However, in practice, since harvesters are subject to considerable dust and grit under working conditions, this type of construction tended to wear out quickly and was generally unsatisfactory. In accordance with our invention we have provided means for accommodating for the difference in planar movement of the power source, as the crank 32, and the cutting means, as the sickle bar 14.

One type of means which we have successfully employed for transmitting the power from the source to the cutting means is that illustrated particularly in Figures 1—B to 5 inclusive wherein a strip 35 is secured to the sickle bar. The strip is formed with upstanding ears 36 of different extent so that a pin 37 may be extended through the ears parallel to the axis of shaft 33 and adapted to be held in a bearing 38 of a pitman 39. The pitman carries another bearing 41 which is secured to the crank 32 so that the sickle bar is joined to the crank for reciprocating movement. By providing the ears 36 of different extent it is possible to extend the pin 37 through them so that it operates in a plane substantially parallel to that in which the crank operates. We have observed that, under operating conditions, there is a tendency for the driven end of the sickle bar to whip. To overcome this tendency, we have found it expedient to extend the sickle bar with an extension 43 so that it may be held, together with strip 35, in a bearing 44 provided adjacent the crank and secured on the angle 11. This bearing is preferably constructed with an apertured cup 46 so that lubricant may be supplied to the sickle bar by placing oil soaked waste or grease in the cup.

In the pitman construction illustrated in Figures 6 to 8 inclusive we have disclosed a mechanism capable of accommodating the cutting means for movement by a power source operating in both a different vertical and horizontal plane from that in which the sickle bar operates. In the structure shown in Figure 3 it is necessary that the sickle bar and the crank move in the same vertical plane otherwise the structure is not capable of successful operation. This entails that the header structure and power transmitting means be constructed with a certain nicety. In accordance with our invention we provide means accommodating within themselves for any ordinary discrepancy as to differences in both horizontal and vertical planes. Thus, in Figure 6, the sickle bar 14 carries a strip 49 having a knob 51 extending from it and formed to receive a cap 52 to provide a universal joint. The cap 52 is adjustable through bolts 53 and is removably secured through the split construction indicated at 54 to a pitman member 56 which extends to the crank 32 or other suitable power source. Movement of the pitman 56 by the crank is effected by securing a roller bearing 57 on the crank by a plate 58 and nut 59. The bearing is carried in a gimbal ring 61 so that rotation of the crank in different vertical and horizontal planes from that which the sickle bar traverses is cared for in the universal joint and in the hinge joints 62 between the gimbal ring and yoke 63 which is secured to the tube. We have found it convenient to construct the yoke 63 of separate members 64 and 65 which engage the gimbal ring 61 and are secured to the pitman by bolts 66. This type of construction permits the crank to be in both a different vertical and a different horizontal plane from that in which the sickle bar normally operates so that the pitman is moving angularly with respect to both the sickle bar and the crank at any instant, the flexible joints provided between the pitman and the driving and driven members obviating the necessity for a nicety of either vertical or horizontal adjustments between the two.

Another type of bearing which we have successfully employed is that illustrated in Figures 10, 11 and 12 wherein a roller bearing 71 is secured on the crank by a plate 72 and nut 73. The bearing is surrounded by a member 74 having an outer face 76 of an arcuate shape so that engagement with a bearing shell 77 formed to receive the arcuate face 76 permits of a relative angular and rotational movement between the bearing shell and the crank. The bearing shell is conveniently constructed of portions 78 and 79 adapted for adjustment about the member 74 by bolts 81. The member 74 has a portion 82 of its arcuate face 76 flattened to permit a lubricant to pass between it and the shell. Adjacent to the bolts 81 this flattened portion 82 is deformed so that relative movement is possible between the member and the shell. Portion 79 of the bearing shell is formed with an extension 83 conveniently secured to the pitman 56 by screw threads 84 and locking means 86 to hold the extension securely upon the pitman.

To accommodate the structures we have herein shown for adequate and convenient lubrication we provide means for carrying a lubricant to the several bearing surfaces. Thus, in the structures illustrated in Figures 6 to 8 inclusive, we preferably form a groove 91 in the gimbal ring so that when lubricant is supplied through connection 92, it traverses about the ring to all points of the bearing.

For effecting lubrication of the hinged joints 62 of the gimbal, a structure such as is illustrated in Figure 9 may be employed wherein a body member 93 is provided to be screwed upon the pitman and to have a yoke arm 94 channeled as at 95 to pass lubricant from the pitman to one of the hinge joints and to the roller bearing. The yoke is assembled by securing another yoke arm 96 to the body member 93 by a bolt 97 which also retains the body member upon the pitman. If desired, the yoke arm 96 may be apertured to pass lubricant from the body member to the other hinge joint. Lubricant supplied to the channel 95 passes to the bearing through a groove 98 formed in the gimbal ring about the bearing.

Lubrication of the bearing illustrated in Figure 10 is accomplished by providing the pitman with a connection 101 as in Figure 3 so that the supply of lubricant is maintained within the pitman and is supplied, during operation, to both the bearings. The conducting of the lubricant into the bearings is had by forming a passage 102 in the bearing shell 77 and by flattening portion 82 of the arcuate face 76 of the member 74 so that the lubricants may pass between the bearing shell and the member 74 and also through a passageway 103 to the roller bearings.

We claim:

1. In a harvester, a header frame, sickle guards attached to said frame and adapted to support said frame above the ground, a sickle bar supported in said guards, a drive shaft supported on said frame, and means to operate said bar from said shaft.

2. In a harvester, a header frame, means secured to the forward end of said frame to support said frame above the ground, a sickle bar slidable in said means, a crank mounted for rotation on said frame, and means to operatively connect said crank to said bar.

3. In a harvester, a header frame, means to support a sickle bar on said frame for reciprocation in a plane inclined to the surface of the ground, a shaft mounted on said frame at an angle to the plane of said sickle bar, and means to operate said bar from said shaft.

4. In a harvester, a header frame, means to support a sickle bar on said frame for reciprocation in a plane inclined to the surface of the ground, a shaft mounted on said frame at an angle to the plane of said sickle bar, and means to operate said bar from said shaft, including a crank on said shaft, a bracket on said bar, and a pitman interconnecting said crank and said bracket.

5. In a harvester, a header frame, means to support a sickle bar on said frame for reciprocation in a plane inclined to the surface of the ground, a shaft mounted on said frame at an angle to the plane of said sickle bar, and means to operate said bar from said shaft, including a crank on said shaft, a bracket on said bar, and a pitman connected to said crank and universally connected to said bracket.

6. In a harvester, a header frame, means to support a sickle bar on said frame for reciprocation in a plane inclined to the surface of the ground, a shaft mounted on said frame at an angle to the plane of said sickle bar, and means to operate said bar on said shaft, including a crank on said shaft, a bracket on said bar, and a pitman universally connected to said crank and universally connected to said bracket.

7. In a harvester, a header frame, sickle guards attached to said frame and adapted to support said frame above the ground, a sickle bar supported for movement, said sickle bar extending in advance of said guards and adapted to contact substantially with said ground when said guards contact said ground, and means to operate said bar.

In testimony whereof, we have hereunto set our hands.

HORATIO W. SMITH.
AUGUST D. BRAASCH.
NORRIS WALTON.